Feb. 21, 1928.
Re. 16,884
J. B. TYTUS
PROCESS OF ROLLING SHEETS
Original Filed March 12, 1923
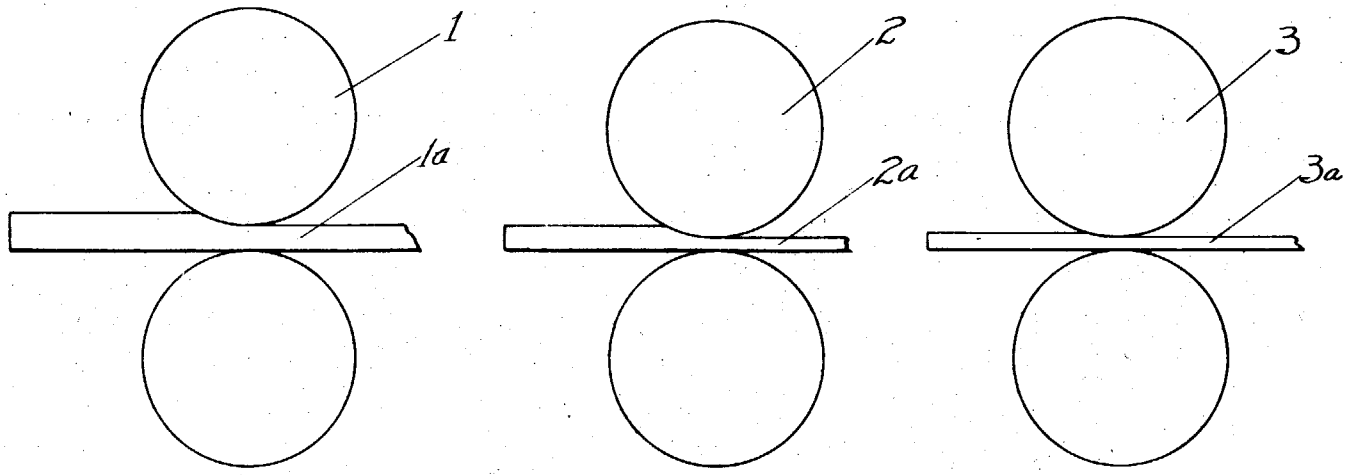
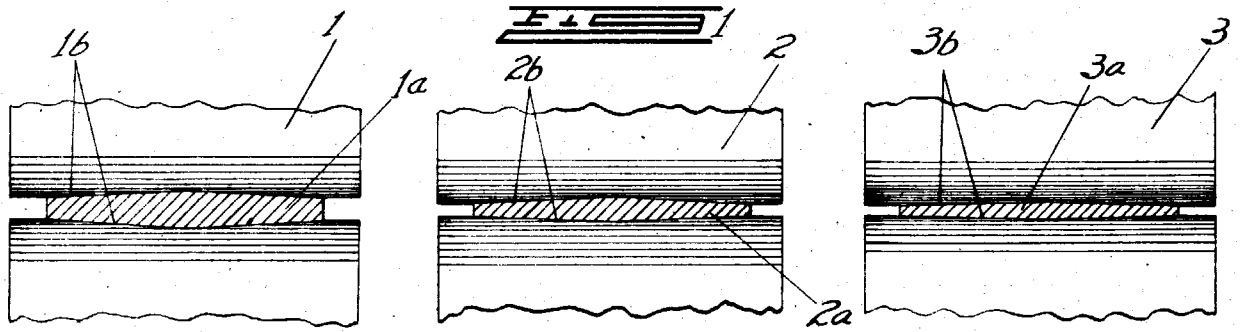
FIG. 1
FIG. 2
FIG. 3
FIG. 4
INVENTOR.
BY John B. Tytus
Albert Allen
ATTORNEYS Reissued Feb. 21, 1928. Re. 16,884

UNITED STATES PATENT OFFICE.

JOHN B. TYTUS, OF MIDDLETOWN, OHIO, ASSIGNOR TO THE AMERICAN ROLLING MILL COMPANY, OF MIDDLETOWN, OHIO, A CORPORATION OF OHIO.

PROCESS OF ROLLING SHEETS.

Original No. 1,602,468, dated October 12, 1926, Serial No. 624,632, filed March 12, 1923. Application for reissue filed January 4, 1928. Serial No. 244,540.

My invention relates to the continuous rolling of metal, more particularly packs of metal sheets or doubled sheets, to finished gauge, and by continuous I mean that the packs or doubles are passed from one set of rolls to another to effect successive reductions thereon, in which each set of rolls is used but once on each pack. Two or more strands will satisfy this definition.

There have been in the past a large number of theoretical suggestions for the rolling of sheet metal to finished gauge by a continuous process. In a few instances continuous mills, so called, although some would have been better classed as tandem mills, have been built and used in sheet rolling. So far as I am advised with these mills, it was always the practise to finish the packs or doubles, from the continuous process, in a single stand of finishing rolls, according to the Welsh system of rolling.

Thus my invention, which has the avowed object of finishing sheets to ultimate gauge in a continuous process, has a basis which is distinct from any practical or even theoretical structure of the past, in that it deals with the problem of reduction of thin, wide metal by single passes through successive stands of rolls in such a way as to solve the problem of control which has heretofore been a stumbling block in attempts at continuous rolling, where the piece, were it a pack or a single thickness, had become so thin and wide that known methods of control failed to produce a satisfactory product with anything approaching a practical commercial regularity.

The discussion of the Welsh system of rolling will not require re-statement in this specification, as it is known at the present time, wherever steel sheets are rolled down from sheet bars. The significant reason to which has been ascribed the necessity of finishing sheets to final gauge on a single stand or rolls, is that the roller can watch the piece as it is being worked upon, and control his roll draft accordingly to suit each particular piece and that the piece having been given preliminary reduction on a single stand of rolls thus acquires a fit to such peculiar variations in contour as the said stand of rolls possesses.

While the above reasons may or may not be entirely correct, it is quite significant of the many costly experiments of the past that economy in production arising from the elimination of extra labor, which follows necessarily from a continuous process, has always been more than overcome by the increase in wasters or ruined pieces, and in roll breakage, and shut downs.

It is the specific object of my invention to so design and control a rolling process, as to accomplish in a mechanical manner the work which a skilled roller would do in finishing a pack on a single stand of two high rolls.

To this end I take into consideration the following features which enter into any sheet rolling method:—

(1) The prepared contour of the rolls.

(2) The temperature of the rolls.

(3) The composition and springiness of the rolls.

(4) The spacing of the rolls, or "screw".

(5) The shape, composition and temperature of the piece.

My ultimate aim is to so control these five factors, that a piece of a predetermined contour and predetermined temperature will be engaged in each stand of a series of pairs of rolls, arranged to successively engage the piece, wherein the rolls have a predetermined contour to fit the piece, said roll contour being the resultant of the five points above mentioned.

The rolls need not necessarily be arranged in successive two high stands, as three or four high stands might also be used.

By "piece", I refer to whatever metal is being worked on. In particular the piece in my process is a pack. In general, it is any piece which is so wide, and has become so thin that the metal will be of the type with respect to its width and thickness, that has heretofore been classed as reducible only by repeated passes in a single stand of rolls. While my process is primarily directed toward reduction of hot metal, I do not wish to limit myself to hot metal alone as the metal may be other than hot when rolled.

To state the matter in another way, if a piece of material of given thickness is caused to pass through a pair of rolls, which are driven so as to pull the piece along and attenuate or reduce it, the resultant shape of the roll engagement will depend in part upon the prepared shape of the rolls, and the temperature thereof, which has caused such expansion as to change this prepared contour. It will depend upon how far the journals of the rolls are permitted to space away from each other, due to the position of the "screw", which forms a stop for at least one of the rolls. It will depend upon the shape and condition of the piece and how resilient the rolls are when at the temperature and under the resultant pressures in question.

When a piece is engaged by the rolls, the rolls will spring at the center, if the piece is thicker than the spacing permitted between the rolls because the journals at the ends of the rolls are the points where the spacing limits are applied.

Where the rolls have been formed originally on a slight concavity, this concavity is usually taken up by the heating of the roll. The heat to the rolls as applied by the piece itself, which is often red hot, is more quickly dissipated at the ends of the roll, with the result of a puffing out of the center thereof. The composition and condition of the rolls affect the puffing tendency, and external treatment of the rolls and journals are usually employed as controlling means in the temperature, shape factor thereof.

The shape of the piece to start with, has also a deciding effect upon the contour of the active pass or space between the rolls, while the piece is between them, particularly when the piece is thin, as a convex piece will naturally tend to affect the spring of the rolls in a different way from a truly rectangular piece.

It should be noted that in speaking of contour of a pack of sheets, a sheet bar, or whatever piece is concerned, I am not referring to any shape which would be apparent to the eye, as the variations over a true straight line to the active pass or space between the rolls while a piece is between them, is not apparent to the eye. The contour or active pass is quite apparent, however, by the examination of the piece, for at the point where the space between the rolls is less than at another, there will be a greater extension of the piece.

My method of successive or continuous rolling operates best in a set of rolls so arranged that the piece is in only one stand at a time, and, while I have no knowledge which will necessarily eliminate the use of the continuous mill, I prefer to use a tandem or other arrangement. The distinction between a continuous mill and a tandem mill is that while each has a succession of rolls, that in the tandem mill the piece emerges from one set of rolls before it is engaged by another, and in the continuous mill the piece is engaged by at least two of the stands at one time. Other arrangements of stands of rolls would be to stagger them or arrange them side by side.

It should be noted that in referring to a continuous rolling process I do not confine myself to any type of mill but refer to the progression of the piece through a series of stands or rolls, in any arrangement.

In the continuous mill the error which may enter into the rolling in one stand, may accumulate or increase, in the second stand without a chance of correcting it, and particularly the continuous mill requires a delicacy of adjustment of roll speeds which is a problem that adds great additional difficulty to the design of the mill. This last is because the piece being longer as it emerges from the first mill will demand a greater speed in the second mill to move the piece along without an accumulation between the two stands. My process is applicable, however, to the continuous mill.

By referring to sheets, I do not desire to be construed as relying upon any one of the current technical definitions between sheets and plates, and between sheets and strips, as the demarcation which I desire to make, is essentially that I produce a thin metal piece which is considerably wider than it is thick. Technically the trade in speaking of sheets refers to thin flat pieces of which the separate pieces making it up (as in a pack) have eighteen gauge (U. S. standard) or higher and the width of an 18 gauge sheet will ordinarily be more than 400 times greater than its thickness.

A better way of defining the kind of material with which I deal, is by comparison thereof with hot rolled strips. Thus a hot rolled sheet or thin plate in the terminology of the art refers to a piece which because of exigencies of process can not be made in a long continuous body, mainly because of the relative width to thickness thereof, whereas a hot rolled strip is a piece which from exigencies of process has distinct limitations in width and thickness, but no limitations as to length. The products which I make and to which I refer fall into the first of these classes, so far as width and thickness, or gauge of the final product is concerned, my problem being to solve the matter of roll control where the metal has become so thin, and at the same time so wide, that the rule of thumb methods of the past have failed, to produce it continuously.

It is the essence of my process, that I provide by the regulation of the elements above discussed for the production of a piece in each stand of rolls which has a convex contour which is slightly more convex than the resultant active pass of the next stand of rolls, considering each active pass in the series as a resultant of the factors outlined.

Thus the preferred manner in which I provide a mechanism for my process consists in first determining the diameter of the rolls and their physical structure, and cutting their surfaces with a concavity, in one or both rolls of each pair, which at a given screw and temperature, thickness and contour of piece will give a resultant convexity of active pass when the piece is between them. I control the temperature of the rolls by external means, and control the temperature of the piece, preferably, by furnaces or heaters between the stands of rolls.

In carrying out my process, the roller must keep in mind the five factors recited, and use them, in the manner with which he will be familiar, in conjunction with each other, to arrange the active pass in each stand of rolls. Thus, if he finds the rolls will not run hollow enough, i. e. if the active pass is too convex in outline, it may be that his rolls are ground with too little concavity to begin with, and should be reground, it may be that he should blow air or pass water onto the centers of the rolls, it may be that the rolls are not springy enough in their composition, it may be that his piece is too hot, or improper screw with relation to heat of the piece has been applied. Then again the difficulty may be that the piece is too convex in cross section, or not convex enough, the latter being the most probable. The skilled roller knows how to control these factors recited, if he knows the effect to be gained, although of course, the usual skilled roller would not be familiar with the bearing of the several factors on each other, along the theoretical lines set forth in this specification.

A typical instance in the rolling mill as operated by me will be as follows:—A roller is given a test piece which he knows will have a convexity alike to the pieces he is to handle on a given run. He will pass this piece through stand after stand of the rolls, and place a gauge upon its edges and middle. If the passes are very bad, of course, the gauge need not be used, as he will know there is something wrong and can see with the eye that he is drawing the edges or middle out too long thereby curling up or buckling the piece.

Having run the test piece or several test pieces, he will by his gauge, or by his eye when he grows skilled in the new practice outlined by me, gain a setting of his rolls which provides an active pass in each stand which is less convex than the piece delivered to it from the preceding stands. Having set his rolls, he will start the packs through the stand without changing them further except in case of trouble when he will again check up by gauge or by eye for progressively less convexity of active pass.

He will naturally be provided with the usual expedients for control of heat on the piece and rolls, control of screw and with knowledge of the starting contour of the pieces he is going to roll.

As a typical analysis of a single instance of proper mode of reduction I give a table of dimensions in cross section of a typical pack in three stages of successive reduction in consecutive passes through three stands of rolls, the numerals being in inches of thickness, the pack being 30 inches wide.

| Starting. | | After first pass. | |
|---|---|---|---|
| Edge | .1875 | Edge | .1423 |
| Middle | .1965 | Middle | .1491. |
| **After second pass.** | | **After third pass.** | |
| Edge | .1146 | Edge | .096 |
| Middle | .1201 | Middle | .1005 |

The active passes are all convex, although the last one shows very little difference between edges and middle. Also it would be possible and practical to vary from the exact figures given above in treatment of the given piece to gain the given final gauge. In practice the final gauge is a fixed requirement on any one order, as is the arrangement of the active pass in each stand to reduce the middle more than the edges and still preserve some convexity. Also, of course, the maximum number of passes is a fixed quantity.

Given the starting convexity of the pack, the number of active passes, and the final gauge to be rolled, the operators can readily calculate a similar table to the above, although as I have stated an absolute and mathematically exact correspondence to the example given, in the several active passes, is by no means required. In the above I have referred to the application of my invention to the rolling of packs, and it will be understood that this is given as an example, and that my novel discoveries are not limited in their application to rolling of multiple thicknesses of metal.

I should also observe, that due to the fact that when the convexities have been provided for properly, which the skilled roller can do readily if he regards the five factors which I have given above, and will further speak of, it will be found that the pack as it enters and passes each stand will lie smooth and feed accurately through the center of the roll stands. Thus it might readily be possible that the skilled roller could in a given instance working merely to the end of getting a smooth pass, hit upon a proper control of his roll bite in individual stands, but it would be next to impossible for him, without knowledge of the necessity of control of the five factors I have given, and the rule of convexity reduction, (i. e. greater reduction of thicker than thinner parts of the piece) for him to handle all of the stands by rule of thumb, or to adjust the stands for different sizes, drafts, kinds of metal, worn and new rolls, etc., such as will be encountered in daily practice on a sheet mill.

I use as many stands of rolls as the desired reduction requires, and furnish to the first stand of the rolls a piece which has been formed with the desired contour to start with.

The thicker the piece is at the start the more readily will it take the contour which is desired without bad results, and if for example I provide a pack or doubled-up body of thin plates, according to the Welsh system, this pack will naturally have a decided convexity of contour, resulting from the spring in the rolls which formed the individual plates from which the pack is made. It is preferable to watch closely the formation of the plates from which the packs are formed, so that the starting contour is exactly right, although as stated, the thickness of the piece makes errors one way or the other of not so much importance at the start.

In the drawings:—

Figure 1 is a side elevation of three tandem rolls in diagram with an exaggerated illustration of three pieces passing between the rolls.

Figure 2 is a section diagram, exaggerated to illustrate the pass through the first stand.

Figure 3 is a like view for the second stand, and

Figure 4 for the third stand.

I have illustrated in diagram three sets of rolls (two high), at 1, 2 and 3 although it will be understood that more stands could be added. The piece is illustrated at $1^a$, $2^a$ and $3^a$. In section in Figure 2 is shown the progressive convexity of the piece, during its reduction. The convexity is, as has been said, not apparent to the eye and has been exaggerated. The piece may be a pack of sheets, or a single plate to begin with. The space between the rolls is defined by the lines $1^b$, $2^b$ and $3^b$, these lines illustrating, by the space between them, the active pass of the rolls.

I will preferably start with a piece formed of plates of the type known as fire bed plate, in forming of packs, when applying my invention thereto. These plates may be formed in a tandem mill operating according to my process, if desired, and when trimmed and piled or doubled should be arranged so that the lengthwise components of the plates in a pack are in line with each other. Thus any crest or convexity on the plates will be added together to produce a pack of a curve of convexity having a shorter diameter than that of any individual plates making it up.

The reasons for maintaining the contour as I have stated are many, but it will suffice to point out, that with a convexity slightly less than the convexity of the preceding pass there will be a tendency of the rolls in a pass in question to line up the piece with the crest of convexity running through the crest of the convex active pass between the rolls.

Also, as the thickness of the piece becomes reduced, and the amount of screw on the rolls, and hence pressure exerted in attenuating the piece, must be varied to effect the desirable reduction, I have found that if the various elements going into the result of a sheet rolling action are controlled so that the active pass of the rolls is one which brings down partially the central convexity of the piece, that just the correct amount of screw to effect the desired reduction will have been applied. I have arrived at this conclusion from many years of analytical observation of the work done by the most skilled sheet rollers.

So far as I am advised it will be necessary for highly skilled workmen to watch the several stands of rolls, to the end of controlling the variable elements so that the true function of the special design of rolls, heating devices, and the like will operate to the end above outlined. The saving in the services of assistants is very great. Loss by waste pieces, and roll breakage will be very slight as compared to past attempts at accomplishing a continuous rolling process.

The term active pass as used in this specification refers to the space between rolls while they are in engagement with the piece being rolled therebeteween.

I do not desire my specification above to be construed as limitation to the claims that follow, wherein it is my desire that the full application of the doctrine of equivalents be followed in their construction.

Having thus described my invention, what I claim as new and desire to secure by Letters Patent, is:—

1. A continuous process for reducing hot metal to sheet form in successive stands of rolls, which consists in passing a piece of metal from one stand to another successively and controlling the active pass of the rolls in each stand so as to form for the next stand a piece of slightly greater convexity than the active pass of said next stand.

2. A continuous process for reducing hot metal to thin wide form in successive stands of rolls which consists in passing a piece of metal through one stand of rolls after another successively and impressing upon the piece by the active pass of the first and each succeeding stand of rolls, a cross sectional shape of other than parallel surfaces, which will be made more nearly parallel surfaces in each active pass.

3. A continuous process for reducing hot metal to sheet-like form which consists in passing a piece of metal through one stand of rolls after another successively, and providing an active pass in each stand of rolls, of different predetermined non-parallel sided contour.

4. A continuous process for reducing a pack or doubled mass of plate metal to sheet form, in successive stands of rolls, which consists in passing a piece of metal from one stand to another successively and controlling the active pass of the rolls in each stand on said pack so as to deliver to the next stand a piece which has a slightly greater convexity than the active pass of said next stand.

5. That process of reduction of metal to sheet form, which consists in forming a pack or doubled mass of plate metal, in which the arrangement is such that the line of feed of the pack will be a continuation of the line of feed in forming each plate thereof, and at suitable temperature passing said pack through successive stands of finishing rolls, and in each stand controlling the active pass of the rolls so as to produce a piece having a slightly less convex form than was the form of the piece when delivered to it.

6. A continuous process for reducing hot metal to sheet-like form which consists in passing a piece of metal through one stand of rolls after another successively, and providing an active pass in each stand of rolls, of predetermined contour, said contour being one which will cause the piece to pass through the middle of each succeeding active pass, but the final contour being within the tolerance of accepted commercial variation as to uniformity of gauge and flatness.

7. A continuous process for reducing wide and thin metal to sheet form in successive stands of rolls, which consists in passing a piece of metal from one stand to another successively and controlling the active pass of the rolls in each stand so as to form for the next stand a piece of slightly greater convexity than the active pass of said next stand.

JOHN B. TYTUS.